No. 838,856. PATENTED DEC. 18, 1906.
E. L. HAHN.
FERTILIZER DISTRIBUTER.
APPLICATION FILED SEPT. 28, 1906.
2 SHEETS—SHEET 2.
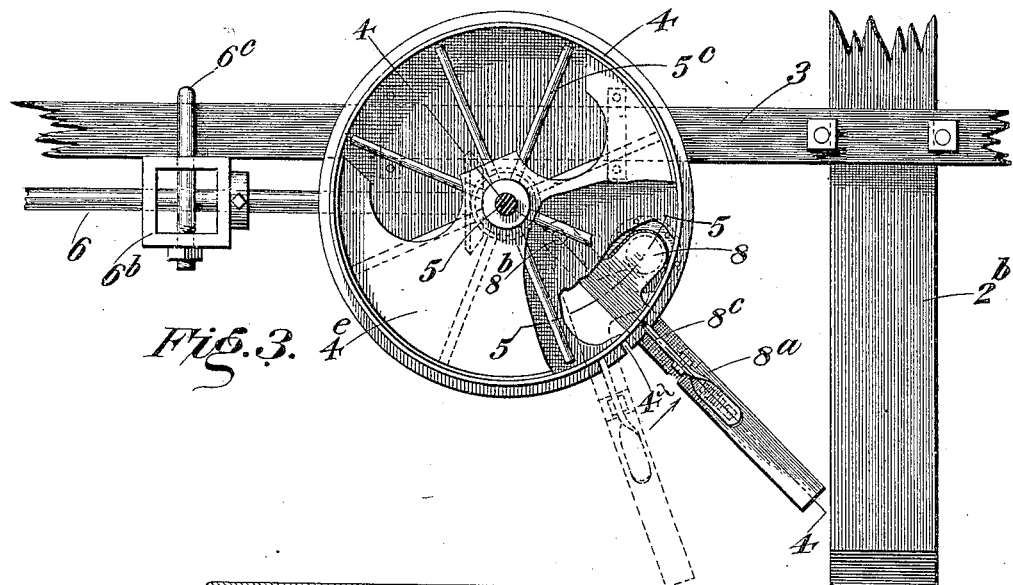
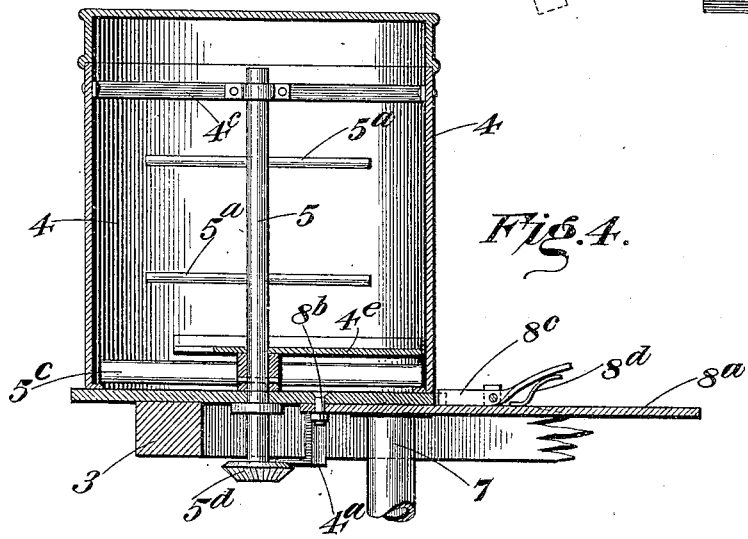
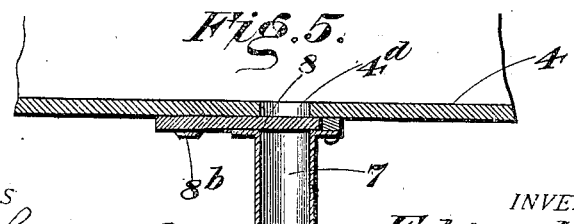
WITNESSES
INVENTOR:
Edward L. Hahn
By Alexander Dowell
Attorneys

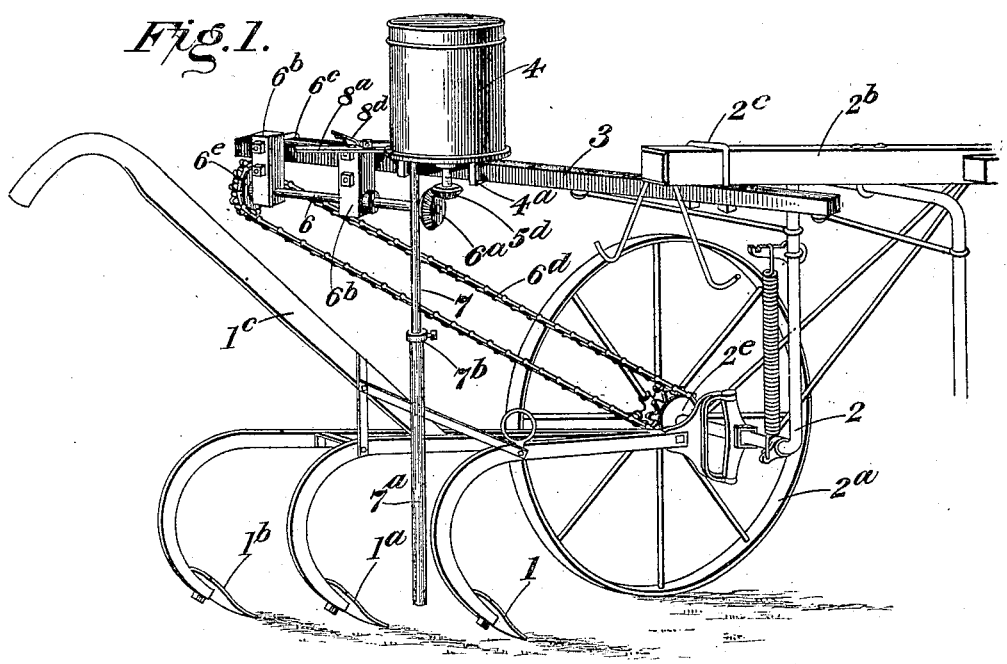

UNITED STATES PATENT OFFICE.

EDWARD L. HAHN, OF MUSCATINE, IOWA.

FERTILIZER-DISTRIBUTER.

No. 838,856.   Specification of Letters Patent.   Patented Dec. 18, 1906.

Application filed September 28, 1906. Serial No. 336,551.

*To all whom it may concern:*

Be it known that I, EDWARD L. HAHN, of Muscatine, in the county of Muscatine and State of Iowa, have invented certain new and useful Improvements in Fertilizer-Distributers; and I hereby declare that the following is a full, clear, and exact description thereof, reference being had to the accompanying drawings, which form part of this specification.

This invention is an attachment for cultivators whereby fertilizer can be supplied to growing crops simultaneously with the cultivation thereof. Its object is to supply the fertilizer to the moist ground at such a distance from the roots of the plants that decomposition of the fertilizer may begin at once and by the time the roots reach the fertilizer the latter has been chemically changed into available plant food.

By this invention the fertilizer can be supplied at different times during the cultivation of the crops at each side of the plants in the rows, and thereby the uninterrupted continuous growth of the plants can be facilitated in the most advantageous manner.

This attachment enables the fertilizer to be supplied to the plants at practically no expense to the agriculturist and saves time and labor in applying the same and distributes the fertilizer in the most advantageous manner simultaneously with the cultivation thereof and with no additional cost.

In all other machines that I am aware of that are used for the distribution of fertilizers the latter is applied either before or at the time of planting the seed or setting out the plants, and this is comparatively detrimental because with the strong fertilizers the tender shoots and roots of the seed are often injured, whereas by my machine and method this difficulty and disadvantage is obviated and a great advantage gained, as by the use of my machine growing plants can be fed a graduated amount of suitable fertilizer, distributed near to the roots of the plants without extra cost for labor or loss of time in applying same.

The attachment is provided with means whereby the amount of fertilizer distributed can be readily graduated, as may be desired, at different points of a field or in a row and as best suits the needs of the plants.

The invention will be fully understood from the accompanying drawings and the following description thereof and summarized in the claims.

In said drawings, Figure 1 is a perspective view of part of a walking straddle-row cultivator with my fertilizer-distributing attachment applied thereto. Fig. 2 is a rear elevation of the fertilizer-distributing attachment. Fig. 3 is an enlarged top view of the fertilizer-distributing attachment with part broken away as applied to a cross-beam of riding-cultivator frame. Fig. 4 is a vertical section on line 4 4, Fig. 3. Fig. 5 is a detail section on line 5 5, Fig. 3.

The device can be applied to walking or riding wheel-cultivators and is illustrated in Fig. 1 as applied to the left-hand side of a straddle-row cultivator, which may be of any suitable construction, and, as shown, the left-hand cultivator has three shovels 1 $1^a$ $1^b$, which are swiveled to the axle 2 in the usual manner, said axle being supported on wheels $2^a$, only one of which is shown in the drawings. The cultivators are manipulated by handles, as $1^c$, as indicated in the drawings.

To the beam $2^b$ of the cultivator, as shown in Fig. 1, is adjustably and detachably attached a bar 3, which may be secured either above or below the tongue of the beam by means of a clip $2^c$ and can be set at any desired angle relatively to the tongue-beam. On this bar 3 is mounted the fertilizer-distributer. The distributer comprises a hopper 4, which may be adjustably secured to the bar 3 by clips $4^a$ of any suitable construction and in such manner that the central vertical axis of the hopper will come to one side of the bar. Arranged centrally in this hopper is a shaft 5, which is journaled in the bottom of the hopper and in a bearing attached to a cross-bar $4^c$ in the hopper, as shown.

On the shaft 5, within the hopper, are stirrer-blades $5^a$, and in the lower part of the hopper is a feed-wheel provided with blades $5^c$, which are adapted to carry fertilizer to an outlet-opening $4^d$ in the bottom of the hopper. The feed-wheel is keyed or pinned to the shaft 5, so as to be rotated thereby, and above this feed-wheel is a partition-plate $4^e$, which covers the major portion of the feed-wheel and also the outlet $4^d$, and so will prevent the fertilizer escaping from the hopper if opening $4^d$ should be left open while the wheel was idle.

The shaft 5 may be driven by means of a bevel-gear $5^d$ on its lower end, meshing with a bevel-gear $6^a$ on a shaft 6, which is journaled in bearings $6^b$, adjustably attached to bar 3 by clips $6^c$, as indicated in the drawings, or in any other suitable manner.

The shaft 6 may be driven from the wheel $2^a$ by means of a sprocket-chain $6^d$, running over a sprocket $6^e$ on the shaft 6, and a sprocket $2^e$, which can be attached to the hub of wheel $2^a$.

A pipe 7 is attached to the under side of the hopper 4 in position to receive the fertilizer discharged through the opening $4^d$, and to the lower end of this pipe is attached a flexible tube $7^a$, preferably of rubber or other suitable material, which is telescoped at its upper end onto the lower end of pipe 7 and can be fastened in any adjusted position thereon by means of a clamp $7^b$. Through this pipe and tube the fertilizer can be delivered in rear of any one of the cultivator-shovels. Preferably the parts are so adjusted that the fertilizer can be delivered in rear of the first shovel 1, so that it can be covered immediately by the second shovel $1^a$, so that the fertilizer can thus be delivered close to the roots of the plants being cultivated.

The opening $4^d$ can be more or less closed, so as to regulate the amount of fertilizer escaping therethrough, by means of a valve-plate 8, which is attached to or forms part of a lever $8^a$, which lever is pivoted at $8^b$ to the bottom of the hopper and can be swung laterally, so as to more or less uncover the opening $4^d$. The lever is provided with a catch $8^c$, adapted to engage notches $4^x$ in the lower edge of the hopper bottom, the said catch being held in engagement with any of the notches by means of a spring $8^d$, which may be of any suitable construction.

From the foregoing it will be obvious that as the plants are cultivated fertilizer can be supplied thereto. The fertilizing-distributer is applicable to all of the commonly used forms of cultivators. By reason of the adjustability of the bar 3 and the adjustability of the hopper and shaft 6 the distributer can be located on the machine in position to deliver the fertilizer to any shovel desired. Of course duplicate fetilizing attachments can be arranged at opposite sides of a straddle-row cultivator, if desired. When applied to wheel-cultivators, it is only necessary to attach a sprocket to the cultivator-wheel to obtain a drive for the fertilizing-distributer.

By this machine the most economical distribution of fertilizer is made and no loss of material or time is involved, and the fertilizer is fed into the furrow opened by one shovel and immediately covered by the following shovel. By having the adjustable and flexible tube $7^a$ the fertilizer attachment does not interfere with the free movment of the cultivator-shovels, which is necessary to enable the shovels to accommodate themselves to inequalities in the ground and to be moved clear of obstructions.

Having described my invention, what I claim as new, and desire to secure by Letters Patent, is—

1. In combination with a cultivator, a bar attached to the cultivator-frame, a fertilizing-hopper adjustably attached to said bar, a feed device in said hopper, a shaft and gearing for actuating the feed device mounted on the bar, means for driving said shaft from the cultivator-wheel, and means for conducting the fertilizer from the hopper to the shovels.

2. In combination with a walking or wheel cultivator, of a bar adjustably attached to the cultivator-frame, a fertilizing-hopper attached to said bar, a feed-wheel in said hopper, a shaft and gearing for actuating the feed-wheel mounted on said bar, a sprocket chain and wheels for driving said shaft from the cultivator-wheel, and means for conducting the fertilizer from the hopper to the shovels.

3. The combination of a supporting-bar, a hopper mounted on said bar having an opening in its bottom, a vertical axially-disposed shaft in the hopper, stirrers and a feed-wheel on said shaft, a partition-plate in the hopper above the feed-wheel, a slide-valve below the feed-wheel for regulating the size of the discharge-opening, a hand-lever for operating the valve, and a catch for locking the lever in any adjusted position.

4. The combination of a cultivator, a supporting-bar attached thereto, a hopper mounted on said bar and having an opening in its bottom, a vertical axially-disposed shaft in the hopper, a feed-wheel on the shaft in the hopper, a partition-plate in the hopper above the feed-wheel, a slide-valve below the wheel for regulating the size of the discharge-opening, and a lever for operating the valve; with a drive-shaft mounted on said bar, gearing between the drive-shaft and feed-wheel shaft, and means for operating said drive-shaft from one of the carrying-wheels of the cultivator.

5. The combination of a wheeled cultivator, a supporting-bar thereon, a hopper adjustably mounted on said bar, a vertical axially-disposed shaft in the hopper, stirrers and a feed-wheel on the shaft in the hopper, a partition-plate above the feed-wheel, a valve below the feed-wheel for regulating the size of the discharge-opening, and a lever operating the valve; with a driven shaft adjustably mounted on said bar, gearing between said driven shaft and the feed-shaft, and a sprocket chain and gearing for operating said driven shaft from one of the carrying-wheels of the cultivator.

6. The combination with a wheel-cultivator, of a bar attached to the frame thereof, a hopper mounted on said bar, a pipe connected with the outlet of the hopper, a flexible tube connected with the lower end of the pipe, a shaft axially arranged in the hopper, a feed-wheel on said shaft, a partition in the hopper above the feed-wheel, a second shaft adjustably supported on the bar, gearing between said shafts, means for driving the second shaft, an adjustable lever attached to the hopper, and a valve attached to said lever for regulating the size of the outlet-opening.

7. The combination with a wheeled cultivator, a bar adjustably attached to the frame thereof above the shovels, a hopper adjustably mounted on said bar above one of the shovels, a pipe connected with the outlet of the hopper, a flexible tube connected with the lower end of the pipe, a shaft axially arranged in the hopper, a feed-wheel on said shaft, a partition in the hopper above the feed-wheel, a shaft adjustably supported on the bar, gearing between said shafts, and a sprocket chain and gears to drive the latter shaft from one of the carrying-wheels of the cultivator, substantially as described.

In testimony that I claim the foregoing as my own I affix my signature in presence of two witnesses.

EDWARD L. HAHN.

Witnesses:
　GRACE HAHN,
　T. R. FITZGERALD.